(12) United States Patent
Yamashita (10) Patent No.: US 7,709,985 B2
(45) Date of Patent: May 4, 2010

(54) MOTOR HAVING IMPROVED MOUNTING STRUCTURE

(75) Inventor: Naoki Yamashita, Shizuoka-ken (JP)

(73) Assignee: Victor Company of Japan, Ltd., Yokohama (JP)

(*) Notice: Subject to any disclaimer, the term of this patent is extended or adjusted under 35 U.S.C. 154(b) by 241 days.

(21) Appl. No.: 12/076,494

(22) Filed: Mar. 19, 2008

(65) Prior Publication Data
US 2008/0252154 A1 Oct. 16, 2008

(30) Foreign Application Priority Data
Apr. 11, 2007 (JP) .............................. 2007-103665

(51) Int. Cl.
*H02K 5/03* (2006.01)
(52) U.S. Cl. ......................................... 310/91
(58) Field of Classification Search .................. 310/91, 310/89; *H02K 5/24*
See application file for complete search history.

(56) References Cited

U.S. PATENT DOCUMENTS 3,544,048 A * 12/1970 Akashi et al. .................. 310/91
6,225,722 B1 * 5/2001 Rupp et al. .................... 310/91

FOREIGN PATENT DOCUMENTS

JP       06-105503      4/1994

* cited by examiner

*Primary Examiner*—Nguyen N Hanh
(74) *Attorney, Agent, or Firm*—Louis Woo (57) ABSTRACT

A motor having an improved mounting structure is composed of a rotor including a rotor yoke; a stator including a bearing, a bearing holder and a base plate fixed to one end portion of the bearing holder; a shaft fixed to the rotor yoke and a damping member interposed between the bearing holder and the base plate. The bearing is fixed to the bearing holder. The rotor is supported through the shaft so as to be rotatable freely with respect to the stator. The bearing holder is fixed to the base plate with having a first area in which the bearing holder directly contacts with the base plate and a second area in which the damping member is interposed between the bearing holder and the base plate.

4 Claims, 7 Drawing Sheets

MOTOR HAVING IMPROVED MOUNTING STRUCTURE

BACKGROUND OF THE INVENTION

1. Field of the Invention

This invention relates to a motor having an improved mounting structure, particularly, relates to a technology for excellently suppressing vibration and a lean of a shaft of a motor such as a geared motor in which external force is applied to the shaft in the radial direction.

2. Description of the Related Art

It has been commonly known that a motor was mounted on a mounting member of an apparatus by interposing a damping member such as rubber between the motor and the mounting member totally so as to prevent vibration from transmitting externally or internally. In this case, the damping member having elasticity was interposed between the motor and the mounting member, so that a shaft of the motor is easily apt to lean.

Accordingly, in case of a geared motor, it has been conducted that another member for correcting a lean of a shaft was provided for suppressing a lean of the shaft in order to maintain engaging accuracy between a driving gear in the geared motor and a driven gear in an apparatus that engages with the driving gear.

Further, in case of a motor having a pulley for belt driving, it has been conducted that another member for correcting a lean of a shaft was provided for suppressing a lean of the shaft as the same manner as a geared motor so as to stabilize engaging of the belt with the pulley and to maintain the belt at constant tension.

One example of such a motor provided with a damping member is disclosed in the Japanese publication of unexamined patent applications No. 6-105503/1994.

According to the Japanese publication of unexamined patent applications No. 6-105503/1994, in order to suppress a lean of a shaft of a geared motor, a bearing for positioning a shaft is provided in addition to interposing a damping member.

Further, the publication discloses that flanges for positioning the shaft are provided on gears.

On the contrary, providing the bearing for positioning the shaft creates problems such that cost of components is drastically increased, dimensions of the motor itself or an apparatus mounting the motor becomes gigantic, the additionally provided bearing increases a burden on the motor, and resulting in shortening life of the motor.

In addition thereto, in case a flange is provided on a gear of a geared motor, a particular treatment or process is necessary for disposing the flange on the gear, and resulting in creating further problem such that manufacturing cost extremely increases.

SUMMARY OF THE INVENTION

Accordingly, in consideration of the above-mentioned problems of the prior arts, an object of the present invention is to provide a motor having an improved mounting structure, which can suppress manufacturing cost and is longer in life without increasing dimensions of the motor itself or an apparatus to be mounted with the motor.

In order to achieve the above object, the present invention provides, according to an aspect thereof, a motor having an improved mounting structure comprising: (a) a rotor including a rotor yoke; (b) a stator including, (1) a bearing, (2) a bearing holder, wherein the bearing is fixed to the bearing holder, and (3) a base plate fixed to one end portion of the bearing holder; (c) a shaft fixed to the rotor yoke, wherein the shaft is supported by the bearing so as to be rotatable freely; and (d) a damping member interposed between the bearing holder and the base plate, wherein the rotor is supported through the shaft so as to be rotatable freely with respect to the stator, and wherein the bearing holder is fixed to the base plate with having a first area in which the bearing holder directly contacts with the base plate and a second area in which the damping member is interposed between the bearing holder and the base plate.

Other object and further features of the present invention will be apparent from the following detailed description when read in conjunction with the accompanying drawings.

BRIEF DESCRIPTION OF THE DRAWINGS

FIG. 4b is a cross sectional view of the other major part of the motor taken substantially along line X-X of FIG. 4a.

FIG. 5b is another explanatory plan view of the improved mounting structure of the motor exhibiting another contact area between the base plate and a damping member shown in FIG. 4a together with the contact area shown in FIG. 5a.

DETAILED DESCRIPTION OF THE INVENTION

In reference to FIGS. 1-7, a motor according to a first embodiment of the present invention is described in detail next.

Figure 1:
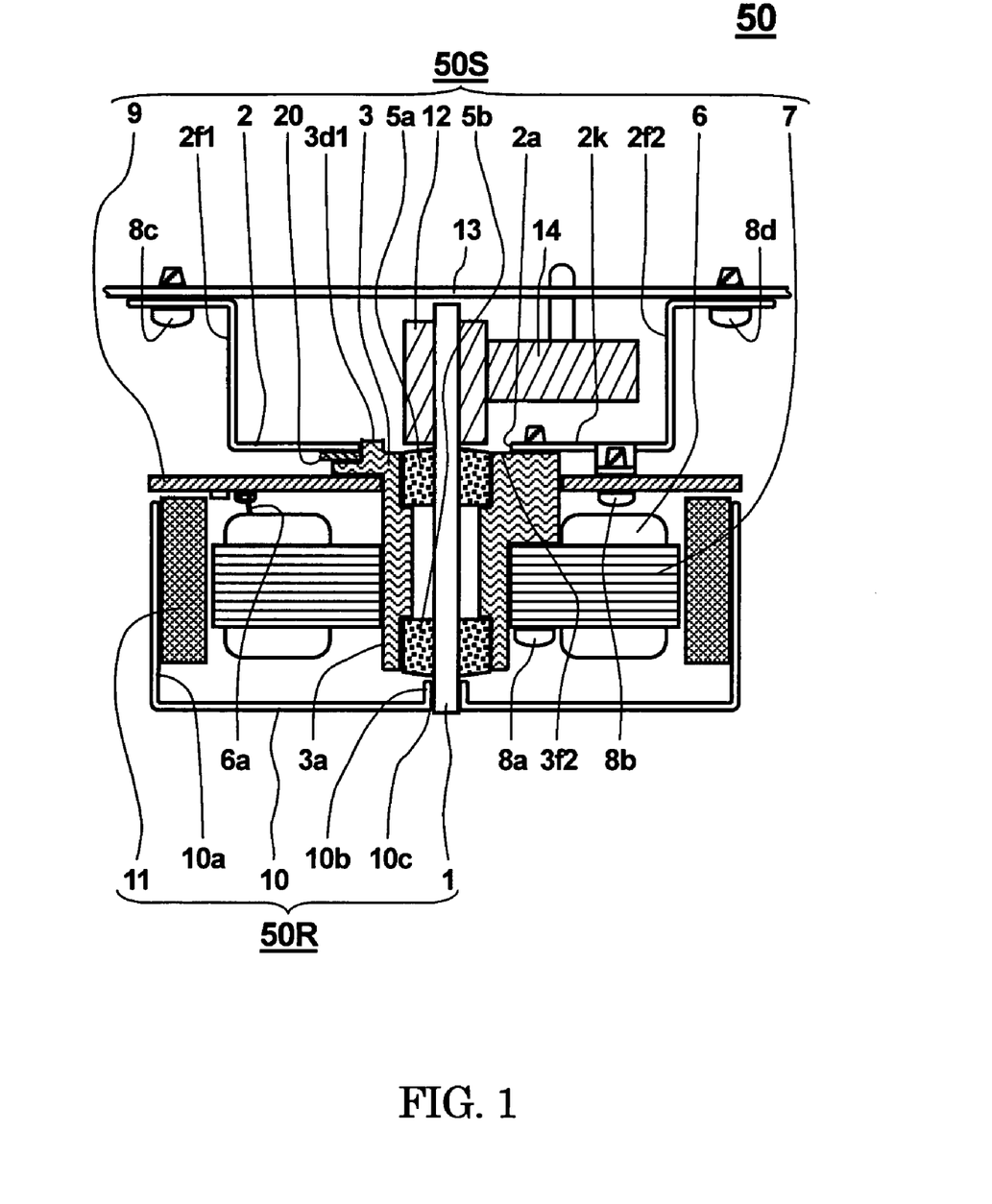
FIG. 1 is a cross sectional view of a motor having an improved mounting structure according to an embodiment of the present invention.

FIG. 1 is a cross sectional view of a motor according to an embodiment of the present invention.

Figure 2:
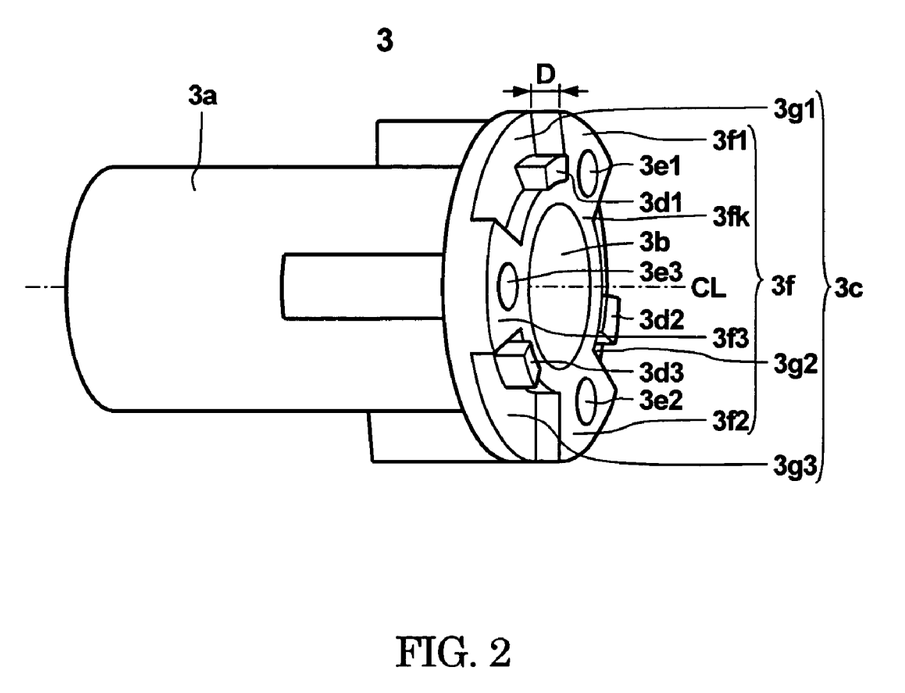
FIG. 2 is a perspective view of a major part of the motor shown in FIG. 1 according to the embodiment of the present invention.

FIG. 2 is a perspective view of a bearing holder of the motor shown in FIG. 1 according to the embodiment of the present invention.

Figure 3:
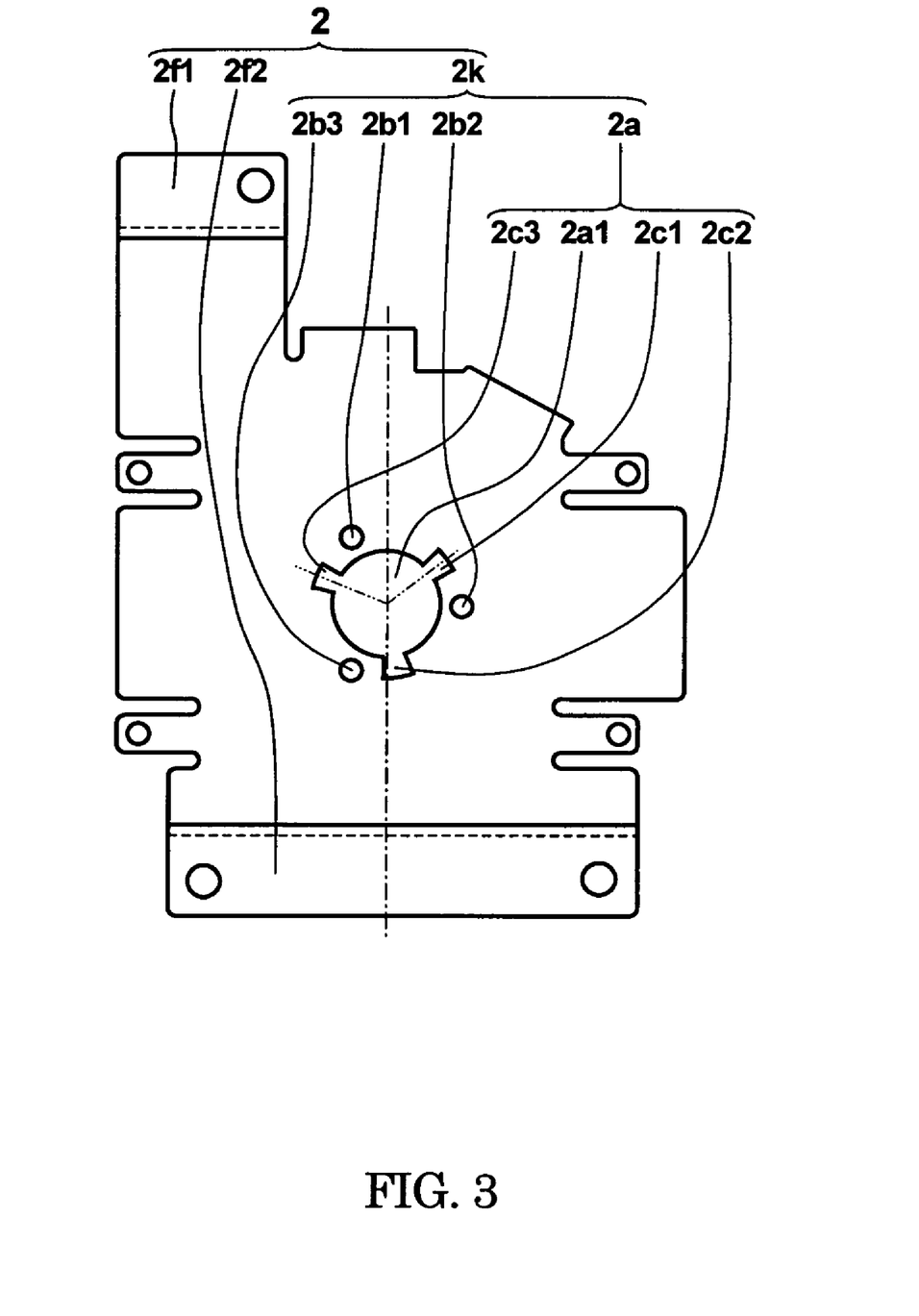
FIG. 3 is a plan view of a base plate of the motor shown in FIG. 1 according to the embodiment of the present invention.

FIG. 3 is a plan view of a base plate of the motor shown in FIG. 1 according to the embodiment of the present invention.

Figure 4A:
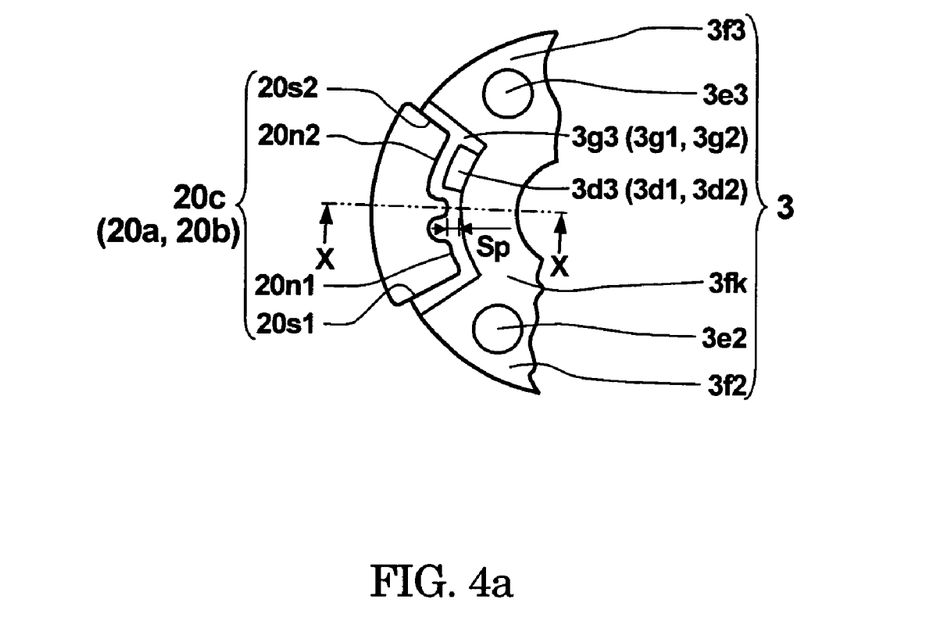
FIG. 4a is a plan view of another major part of the motor shown in FIG. 1 according to the embodiment of the present invention.

FIG. 4a is a plan view of a damping member according to the embodiment of the present invention exhibiting a relative disposition of the damping member with respect to the bearing holder.

Figure 4B:
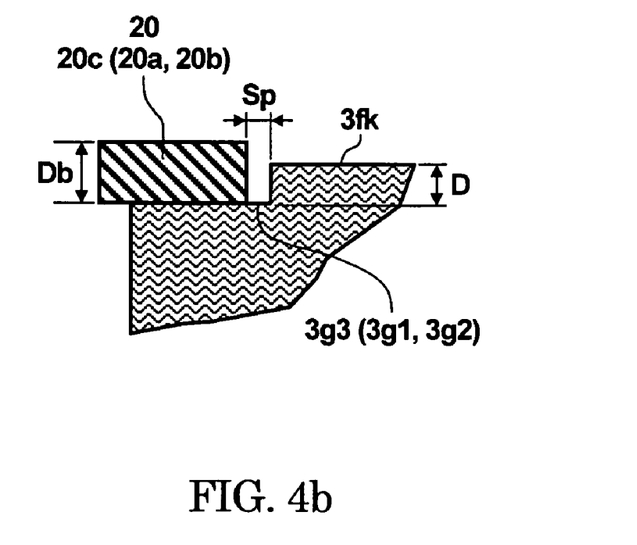

FIG. 4b is a cross sectional view of the damping member taken substantially along line X-X of FIG. 4a.

Figure 5A:
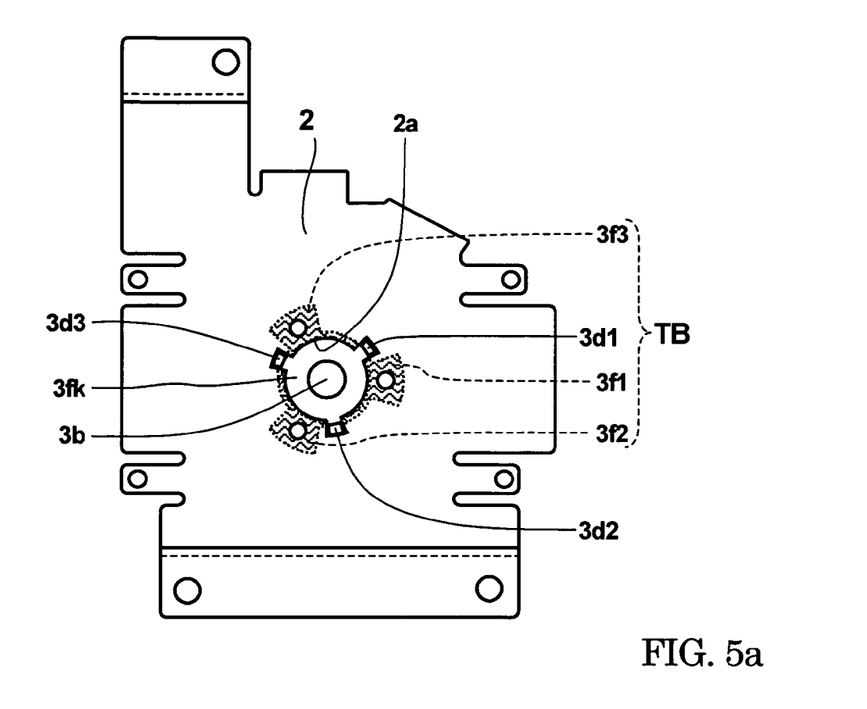
FIG. 5a is an explanatory plan view of an improved mounting structure of the motor exhibiting a contact area between the base plate shown in FIG. 3 and the major part shown in FIG. 2 according to the embodiment of the present invention.

FIG. 5a is an explanatory plan view of the base palate shown in FIG. 3 exhibiting a contact area of the bearing holder shown in FIG. 2 with the base plate.

Figure 5B:
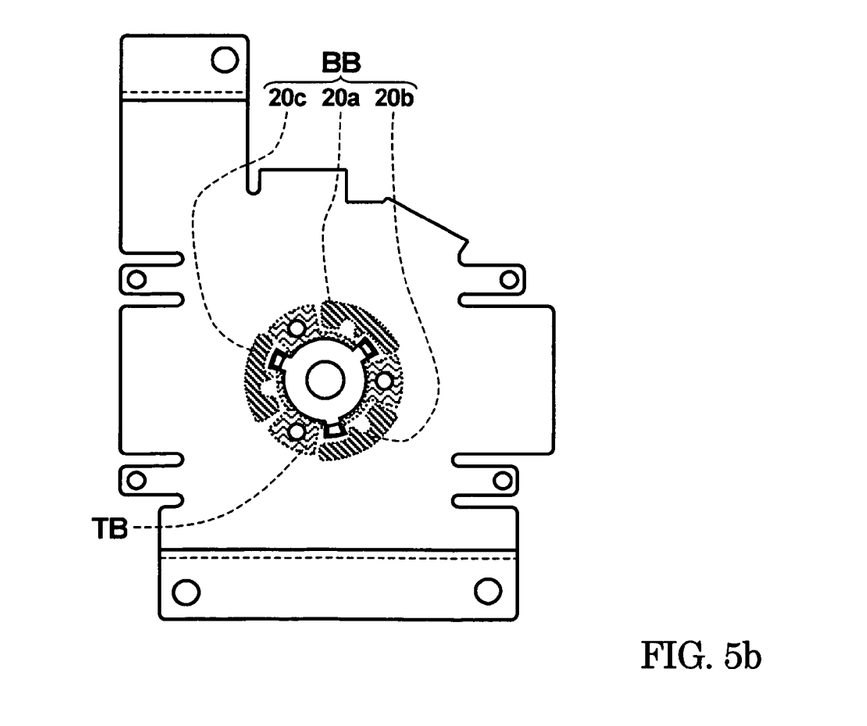

FIG. 5b is another explanatory plan view of the base palate exhibiting another contact area of the damping member shown in FIG. 4a with the base plate together with the contact area of the bearing holder shown in FIG. 5a.

Figure 6A:
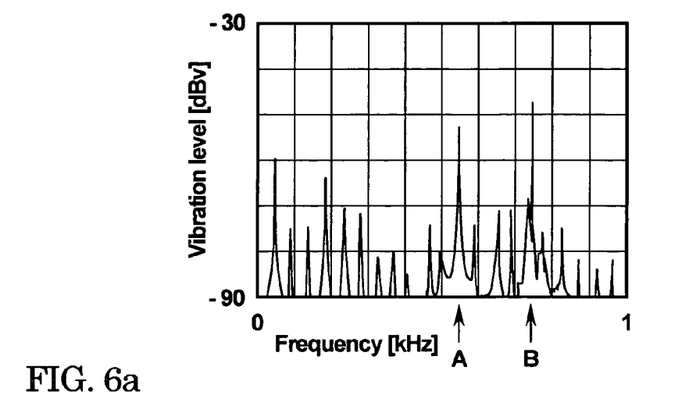
FIG. 6a is a characteristic graph exhibiting relation between frequency and a level of vibration of a first motor according to a first comparative example.
Figure 6B:
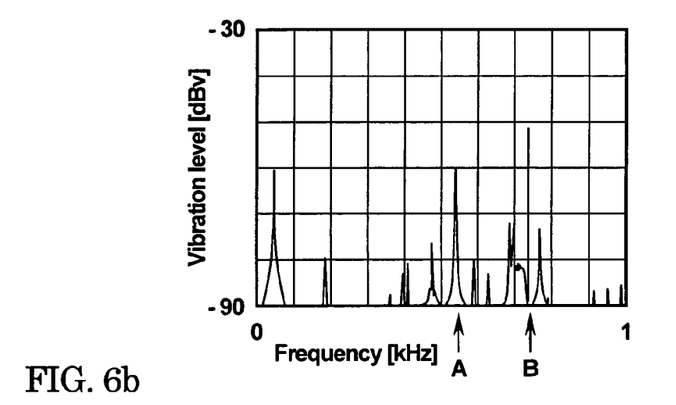
FIG. 6b is a characteristic graph exhibiting relation between frequency and a level of vibration of a second motor according to a second comparative example.
Figure 6C:
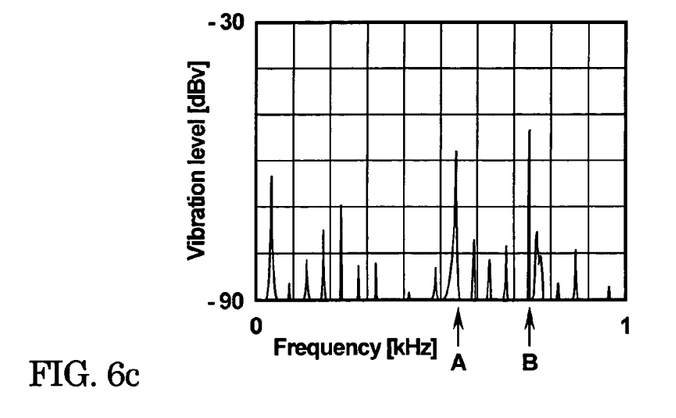
FIG. 6c is a characteristic graph exhibiting relation between frequency and a level of vibration of the motor according to the embodiment of the present invention.

FIGS. 6a-6c are characteristic graphs exhibiting relation between frequency and a level of vibration of a first motor according to a first comparative example, a second motor of a second comparative example and the motor of the embodiment of the present invention respectively.

Figure 7:
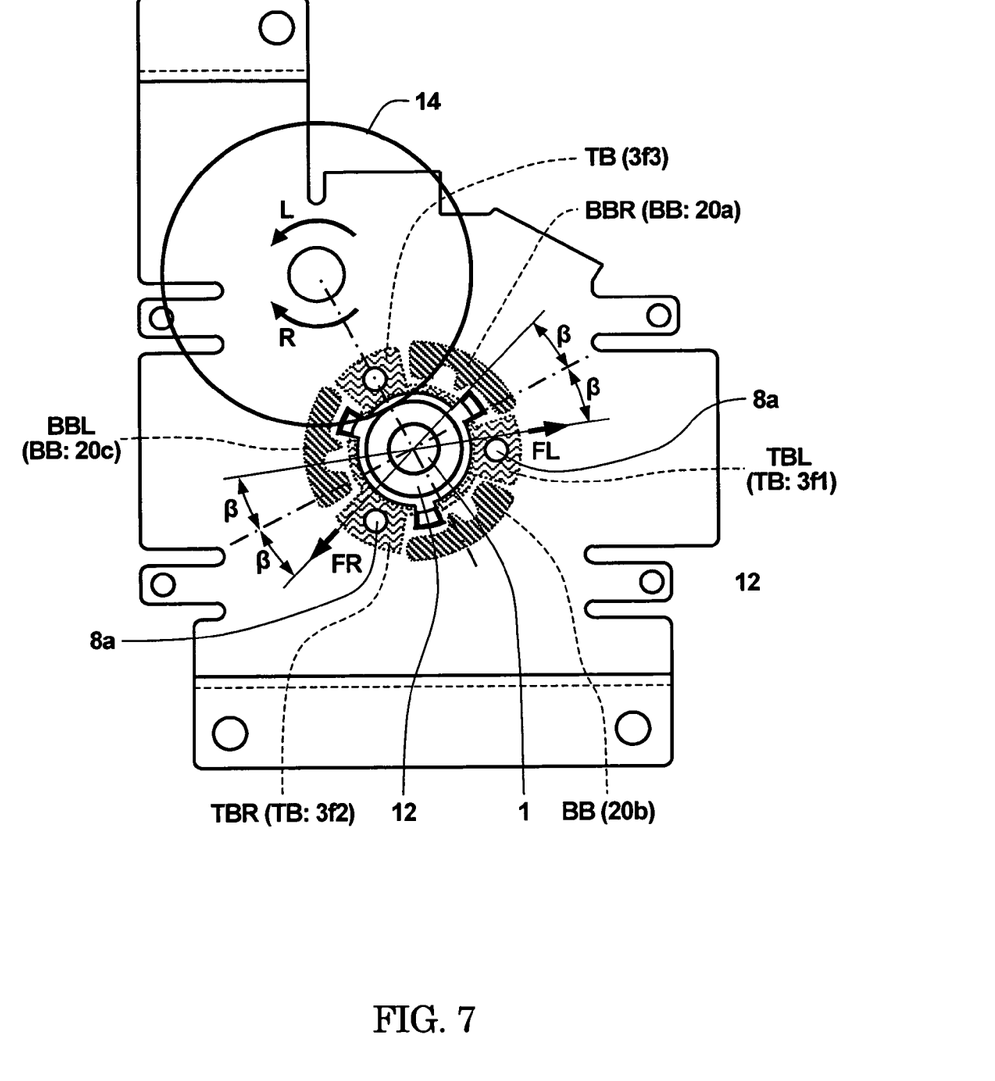
FIG. 7 is a plan view of the motor according to the embodiment of the present invention exhibiting relative disposition of components and contact areas shown in FIG. 5b.

FIG. 7 is a plan view of the motor according to the embodiment of the present invention exhibiting relative disposition of components and the contact areas shown in FIG. 5b.

A motor according to the first embodiment of the present invention is a geared motor to be used in a laser beam printer, for instance, so as to drive a photosensitive drum.

In FIG. 1, a motor 50 is composed of a stator 50S and a rotor 50R, wherein the rotor 50R rotates with respect to the stator 50S.

The stator 50S is further composed of a base plate 2, a bearing holder 3, one pair of bearings 5a and 5b that are fixed to the bearing holder 3, a coil 6, a core 7 and a printed circuit board 9. The base plate 2 is further provided with a base surface section 2k, arm sections 2f1 and 2f2 that rise upright in a reverse L-letter shape and a opening section 2a that is formed in the middle of the base plate 2. The bearing holder 3 is made from a resin material and fixed to the base plate 2 in concentric with the opening section 2a of the base surface section 2k by means of a screw 8a. The coil 6 is wound around the core 7, and the core 7 is fixed on an outer circumferential surface 3a of the bearing holder 3. The printed circuit board 9 is fixed on the base surface section 2k of the base plate 2 by a screw 8b, and a lead wire 6a of the coil 6 is connected to the printed circuit board 9.

Further, the base plate 2 is made of metal plate and formed by the press working. The bearing holder 3 is formed by a resin material through the injection molding process. The bearings 5a and 5b are oil impregnated sintered bearings.

Furthermore, a damping member 20 is partially interposed between the base plate 2 and the bearing holder 3. Construction of interposing the damping member 20 between the base plate 2 and the bearing holder 3 will be detailed.

Hereupon, the damping member 20 is generically illustrated in FIG. 1. Actually, three damping members 20a-20c are interposed between the base plate 2 and the bearing holder 3. Actual configuration of the damping members 20a-20c will be detailed.

The rotor 50R is further composed of a shaft 1, a rotor yoke 10 in a cup shape and a ring magnet 11 that is fixed on an inner surface of a wall section 10a of the rotor yoke 10.

Further, in the center of the rotor yoke 10, a through hole 10c having a risen wall section 10b is formed by the burring process.

One end portion of the shaft 1 is force fitted into the through hole 10c of the rotor yoke 10, and then the shaft 1 is integrated into the rotor yoke 10. In other words, a lower end portion of the shaft 1 is force fitted into the through hole 10c of the rotor yoke 10.

Furthermore, the other end portion of the shaft 1 passes through respective through hole of the bearing 5b disposed on the bottom of and the bearing 5a disposed on the top of the bearing holder 3, and protrudes from the bearing 5a upward. A driving gear 12 is force fitted on the protruded end portion of the shaft 1, wherein the driving gear 12 is provided as a power transmitting section for transmitting power of the motor 50 outside.

By the above-mentioned construction of the motor 50, the rotor 50R is supported to be rotatable freely with respect to the stator 50S.

More, in FIG. 1, the base plate 2 of the motor 50 is fixed to a chassis 13 of a laser beam printer by means of screws 8c and 8d.

Moreover, a driven gear 14, which is supported by the chassis 13 to be rotatable, engages with the driving gear 12, wherein the driven gear 14 is provided as a power acceptance section of motor power that is transmitted through the power transmitting section (driving gear 12) of the motor 50.

In reference to FIGS. 2, 4a and 4b, a structure of the bearing holder 3 to be mounted on the base plate 2 is described in detail next.

FIG. 2 is a perspective view of the bearing holder 3 of the motor 50, FIG. 4a is a plan view of the damping member 20 exhibiting a relative disposition of the damping member 20 with respect to the bearing holder 3 and FIG. 4b is a cross sectional view of the damping member 20 taken substantially along line X-X of FIG. 4a.

As shown in FIG. 2, the bearing holder 3 is formed in a cylindrical shape and provided with a through hole 3b to which the bearings 5a and 5b are fixed.

Further, on one end portion 3c of the bearing holder 3, which faces toward the base plate 2 when assembled as the motor 50, three screw holes 3e1-3e3 for the screw 8a are bored around the through hole 3b at an equiangular interval apart from each other in the circumferential direction.

Furthermore, the end portion 3c is provided with an end surface 3f, which is common to open holes of the screw holes 3e1-3e3, and three recessed sections 3g1-3g3 (hereinafter generically referred to as "recessed section 3g"), which sink below the end surface 3f to a depth of "D" and are formed among the screw holes 3e1-3e3 in the circumferential direction.

More specifically, the end surface 3f is formed with having a base surface section 3fk in a ring shape, which surrounds the through hole 3b, and three radial surface sections 3f1-3f3, which extend radially from the base surface section 3fk and include the open holes of the screw holes 3e1-3e3 respectively.

Moreover, three protruding sections 3d1-3d3 (hereinafter generically referred to as "protruding section 3d") are formed on the recessed sections 3g1-3g3 respectively. The protruding section 3d protrudes above the end surface 3f along a centerline CL in the radial direction with abutting on the base surface section 3fk.

On the other hand, as shown in FIG. 3, the base plate 2 to which the bearing holder 3 is fixed is provided with a base surface section 2k, two arm sections 2f1 and 2f2, an open hole section 2a formed on the base surface section 2k and three through holes 2b1-2b3, which are bored around the open hole section 2a at an equiangular interval apart from each other in the circumferential direction.

Further, the open hole section 2a is formed with a circular hole 2a1 and three cut out sections 2c1-2c3, which extend radially from edge section of the open hole section 2a and are disposed among the through holes 2b1-2b3 respectively at an equiangular interval apart from each other in the circumferential direction.

Furthermore, the through holes 3e1-3e3 of the bearing holder 3 and the screw holes 2b1-2b3 of the base plate 2 are integrated, and then the base plate 2 and the bearing holder 3 are fixed together by the screws 8a.

More, the protruding sections 3d1-3d3 are engaged with the cut out sections 2c1-2c3, and resulting in positioning the bearing holder 3 in the radial direction and the rotational direction with respect to the base plate 2.

Moreover, as shown in FIG. 4a, the damping members 20a-20c (generically referred to as "damping member 20") are affixed on the recessed sections 3g1-3g3 respectively (hereinafter the recessed sections 3g1-3g3 are generically referred to as "recessed section 3g").

Hereupon, the damping member 20 is made from a material having elasticity. Rubber, for instance, can be used for the damping member 20. As a matter of course, any material that highly exhibits damping effect is preferable for the damping member 20.

As shown in FIG. 4a, the damping member 20 is formed in a tight arc shape. In each of the damping members 20a-20c, inner edge portions 20n1 and 20n2 of an inner contour of the damping member 20 and both side edge portions 20s1 and 20s2 are formed slightly smaller than a contour of the recessed section 3g. The inner edge portion 20n2 is also formed in a shape not to interfere with the protruding section 3d.

Further, as shown in FIG. 4b, the damping members 20a-20c are affixed on the recessed sections 3g1-3g3 respectively with remaining a gap Sp between the inner edge section 20n1 and an outer wall section of the base surface section 3fk and between the inner edge section 20n2 and an outer wall of the protruding section 3d respectively.

More, thickness of the damping member 20 is designed to be "Db" that is larger than the depth "D" of the recessed section 3g.

More specifically, the depth "D", the thickness "Db", a difference "α" between the thickness "Db" and the depth "D" (α=Db−D) and the gap "Sp" are 0.700 mm, 0.935 mm, 0.235 mm and 1.50 mm (center value) respectively. In other words, D=0.700 mm, Db=0.935 mm, α=(Db−D)=0.235 mm and Sp=1.50 mm (center value) respectively.

Accordingly, when the bearing holder 3 is fixed to the base plate 2, the end surface 3f including the base surface section 3fk and the radial surface sections 3f1-3f3 of the bearing holder 3 closely contacts with the base surface section 2k of the base plate 2. At the same time, the damping members 20a-20c also contact with the base plate 2 while pressing the base plate 2 upward.

In this case, pressure force of the damping member 20 is repulsive force, which arises when the damping member 20 is flattened out by "α", wherein the parameter "α" is defined as a margin for depression.

Further, it is essential that the contour of the damping member 20 expands when the damping member 20 is depressed in the thickness direction. However, the gap "SP" is designed for tolerating the expansion of the contour of the damping member 20.

As mentioned above, the bearing holder 3 is fixed to the base plate 2 by intervening specific areas including areas directly contacting with each other (hereinafter referred to as "direct contact area") and other areas that interpose the damping members 20a-20c between the bearing holder 3 and the base plate 2 (hereinafter referred to as "interposing area").

More specifically, fixing the bearing holder 3 to the base plate 2 while intervening the specific areas is illustrated in FIGS. 5a and 5b. In FIGS. 5a and 5b, reference signs "TB" and "BB" denote "direct contact area" and "interposing area" respectively.

FIG. 5a shows only the "direct contact areas" TB on the base plate 2, and FIG. 5b shows both the "direct contact areas" TB and the "interposing areas" BB on the base plate 2.

In the embodiment of the present invention, the "direct contact areas" TB and the "interposing areas" BB are alternately disposed in the circumferential direction at an equiangular interval apart from each other in the circumferential direction as it is apparent from FIG. 5b.

As mentioned above, the motor 50 according to the embodiment of the present invention is provided with the "direct contact areas" TB and the "interposing areas" BB. In this regard, the shaft 1 is prevented from vibration by means of the "interposing areas" BB as well as being prevented from leaning by means of the "direct contact areas" TB.

In reference to FIGS. 6a-6c, an effect of preventing the shaft 1 from vibration is described on the basis of a result of actual measurement.

The actual measurement is such that a motor to be tested is mounted on a prescribed panel. Then vibration of the motor is measured by means of a vibration tester; "Motor Vibrophonic Monitor" model MV-90 manufactured by KCG Kokusai Co., Ltd. Output from the vibration tester is displayed on a spectrum analyzer. FIGS. 6a-6c are graphs showing waveforms displayed on the spectrum analyzer.

First Comparative Example

A first motor 50h1 is manufactured as a first comparative example. The first motor 50h1 is assembled by such a way that the bearing holder 3 is fixed to the base plate 2 without interposing the damping member 20. In other words, the bearing holder 3 is fixed to the base plate 2 while they directly contact with each other only in the "direct contact areas" TB. Then, a vibration characteristic is measured by the vibration tester.

Second Comparative Example

A second motor 50h2 is manufactured as a second comparative example. The second motor 50h2 is assembled by such a way that the bearing holder 3 is fixed to the base plate 2 by interposing one ring-shaped damping member of which material is the same as that of the damping member 20 between them. In other words, the bearing holder 3 is fixed to the base plate 2 while they do not directly contact with each other but interpose the ring-shaped damping member between them.

FIG. 6a shows a waveform of the first motor 50h1 according to the first comparative example, FIG. 6b shows a waveform of the second motor 50h2 according to the second comparative example and FIG. 6c shows a waveform of the motor 50 according to the embodiment of the present invention. In FIGS. 6a-6c, the X-axis exhibits a frequency in kHz and the Y-axis exhibits a vibration level in dBv. The higher the vibration level is, the larger the vibration is.

According to a result of measurement, as shown in FIGS. 6a-6c, any of the motors 50, 50h1 and 50h2 exhibits noticeable vibration peaks at frequencies of 545 Hz and 727 Hz. The frequencies of 545 Hz and 727 Hz are indicated by arrows A and B respectively in FIGS. 6a-6c. However, peak values of the motors 50 and 50h2 in which a damping member is interposed between the base plate 2 and the bearing holder 3 are relatively lower than those of the motor 50h1, which excludes the damping member. In this connection, it is apparent that the damping member is remarkably effective for suppressing vibration.

Further, peak values of vibration level of the motor 50 according to the embodiment of the present invention are almost equivalent to those of the second motor 50h2 according to the second comparative example although the damping member 20 is partially used in the contacting area between the bearing holder 3 and the base plate 2 in comparison with the second motor 50h2.

More specifically, actual peak values of vibration level of respective motors 50, 50h1 and 50h2 are shown in Table 1 below. In Table 1, a value of "Over All" denotes acceleration value of the G-force of vibration outputted from the vibration tester; model MV-90. The smaller the G-force is, the lower the vibration is.

TABLE 1

|  | Fist comparative example | Second comparative example | First embodiment |
|---|---|---|---|
| Over All [G] | 0.11 | 0.08 | 0.08 |
| A: 545 Hz [dBv] | −52 | −60 | −59 |
| B: 727 Hz [dBv] | −48 | −54 | −54 |

As a result of measurement mentioned above, only by partially interposing a damping member made from a less expense material such as rubber, the motor 50 according to the embodiment of the present invention exhibits excellent damping effect of vibration equivalent to that of the conventional motor such as the second motor 50h2 according to the second comparative example, which wholly interposes a damping member all around the end portion 3c of the bearing holder 3.

Further, the motor 50 exhibits an excellent effect of preventing the shaft 1 from leaning. The effect is hardly realized by the second motor 50h2 according to the second comparative example.

Accordingly, the motor 50 according to the embodiment of the present invention achieves excellent effects such that a manufacturing cost is suppressed, dimensions of the motor 50 itself or an apparatus to be mounted with the motor 50 are not expanded and life of the motor 50 is extended furthermore as well as suppressing occurrence of vibration and preventing the shaft from leaning.

In reference to FIG. 7, the excellent effect of preventing the shaft 1 from leaning achieved by the motor 50 is described in detail next.

FIG. 7 is a plan view of the motor 50 exhibiting relative disposition of the shaft 1, the driving gear 12, the driven gear 14 and contact areas shown in FIG. 5b.

In FIG. 7, when the motor 50 is operated so as to rotate the driven gear 14 counterclockwise or in an arrow "L" direction, the driving gear 12 receives force "FL" in a direction of a pressure angle "$\beta$" as counter-force of the driven gear 14. The pressure angle "$\beta$" is generally set to 20 degrees.

As shown in FIG. 1, the driving gear 12 is fixed to the upper end portion of the shaft 1, so that the force "FL" acts on the shaft 1, and resulting in leaning the shaft 1 in the direction of the force "FL".

Further, the shaft 1 is inserted into the bearing holder 3, so that the bearing holder 3 is forced to lean in the direction of the force "FL". As a result, the force "FL" acts on the bearing holder 3 so as to separate the end surface 3f on one side of the bearing holder 3 in the "FL" direction from the base plate 2.

In this regard, as shown in FIG. 7, the motor 50 according to the embodiment of the present invention is provided with the "direct contact area" TBL (TB: 3f1), which is disposed in a first area on a transverse line of action of the force "FL" in the direction of the force "FL", and the "interposing area" BBL (BB: 20c), which is disposed in a second area opposite to the "direct contact area" TBL with respect to the shaft 1.

The first area in which the "direct contact area" TBL is disposed is just the above-mentioned position where the one side of the bearing holder 3 leaves from the base plate 2. Providing the "direct contact area" TBL in the first area can effectively prevent the bearing holder 3 or the shaft 1 from being leaned by means of fastening force of the screw 8a.

Further, the second area in which "interposing area" BBL is disposed is a position where the other side of the bearing holder 3 approaches the base plate 2. Interposing the damping member 20c, which achieves excellent repulsive force against compression, between the base plate 2 and the bearing holder 3 in the second area creates the excellent effect of preventing the motor 50 from vibration.

On the other hand, when the motor 50 is operated so as to rotate the driven gear 14 clockwise or in an arrow "R" direction, the driving gear 12 receives force "FR" in a direction of a pressure angle "$\beta$" as counter-force of the driven gear 14.

In this case, as shown in FIG. 7, the motor 50 is provided with the "direct contact area" TBR (TB: 3f2), which is disposed in a third area on a transverse line of action of the force "FR" in the direction of the force "FR", and the "interposing area" BBR (BB: 20a), which is disposed in a fourth area opposite to the "direct contact area" TBR with respect to the shaft 1 as the same manner as the relationship between the "direct contact area" TBL and the "interposing area" BBL.

As a result, providing the "direct contact area" TBR and the "interposing area" BBR also achieves excellent effect of preventing the motor 50 from vibration as well as preventing the shaft 1 from being leaned.

Accordingly, it is most preferable for the "direct contact areas" TBL and TBR and the "interposing areas" BBL and BBR to be disposed in respective areas, which are allocated in the circumferential direction and include the transverse lines of action of the force "FL" and "FR" in the directions of the force "FL" and "FR" along the pressure angle "$\beta$" respectively.

According to the present invention, as mentioned above, the motor achieves excellent effects such that manufacturing cost is suppressed, dimensions of not only the motor itself but also an apparatus to be mounted with the motor are not expanded and the life of the motor is extended as well as preventing the motor from generating vibration and preventing the shaft from leaning.

While the invention has been described above with reference to a specific embodiment thereof, it is apparent that many changes, modifications and variations in configuration, materials and the arrangement of equipment and devices can be made without departing form the invention concept disclosed herein.

For instance, the motor according to the present invention is a geared motor. However, the motor is not limited to a geared motor. The present invention can be applied for any general purpose motor. It should be understood that the excellent effects achieved by the present invention such as preventing vibration and preventing the shaft from leaning against external force could also be achieved by such a general purpose motor.

Further, the driven gear is not limited to be provided in an apparatus to be mounted with the motor as mentioned above. The driven gear can be mounted in the motor itself.

Furthermore, with respect to the power transmitting section and the power acceptance section, they are described in the embodiment of the present invention as the drive gear and the driven gear respectively. However, they are not limited to gears. It should be understood that a combination of pulley and belt or a combination of cam and cam follower could be applied for the power transmitting section and the power acceptance section.

In addition thereto, it will be apparent to those skilled in the art that various modifications and variations could be made in the motor and the disc drive apparatus field in the present invention without departing from the scope of the invention.

What is claimed is:

1. A motor having an improved mounting structure comprising:
   (a) a rotor including a rotor yoke;
   (b) a stator including,
      (1) a bearing,
      (2) a bearing holder, wherein the bearing is fixed to the bearing holder, and
      (3) a base plate fixed to one end portion of the bearing holder;
   (c) a shaft fixed to the rotor yoke, wherein the shaft is supported by the bearing so as to be rotatable freely; and
   (d) a damping member interposed between the bearing holder and the base plate,
   wherein the rotor is supported through the shaft so as to be rotatable freely with respect to the stator, and
   wherein the bearing holder is fixed to the base plate with having a first area in which the bearing holder directly contacts with the base plate and a second area in which the damping member is interposed between the bearing holder and the base plate.

2. The motor having an improved mounting structure as claimed in claim 1, wherein the first area and the second area are disposed alternately around an axis of the bearing holder in the circumferential direction.

3. The motor having an improved mounting structure as claimed in claim 1, the motor further comprising a power transmitting section and a power acceptance section, wherein the power acceptance section contacts with the power transmitting section and motor power is transmitted from the power transmitting section to the power acceptance section, and
   wherein the shaft has a protruded section protruding from one end surface of the bearing holder and the power transmitting section is mounted on the protruded section of the shaft, and
   wherein the second area is provided at a position in an opposite direction of force that is applied to the shaft by the power acceptance section with respect to the shaft.

4. The motor having an improved mounting structure as claimed in claim 3, wherein the power transmitting section is any of a gear, a pulley and a cam, and
   wherein the power acceptance section is any of a gear, a belt and a cam follower.

* * * * *